United States Patent [19]

Corvese, Jr.

[11] 4,141,524

[45] Feb. 27, 1979

[54] TUBE HOLDER FOR IMMOBILE PATIENTS

[76] Inventor: Louis Corvese, Jr., 220 Randall St., Cranston, R.I. 02920

[21] Appl. No.: 773,261

[22] Filed: Feb. 28, 1977

[51] Int. Cl.² ............................................. F16L 3/08
[52] U.S. Cl. ................................... 248/70; 248/68 R; 248/74 A; 248/226.1; 248/287; 248/316 D
[58] Field of Search ............ 248/65, 70, 68 R, 68 CB, 248/74 A, 75, 51, 103, 279, 285, 287, 226.1, 226.4, 226.5, 229, 316 D; 5/317 R

[56] References Cited

U.S. PATENT DOCUMENTS

| | | | |
|---|---|---|---|
| 1,631,355 | 6/1927 | Baldwin | 248/229 X |
| 1,709,898 | 4/1929 | Cunneen | 248/70 |
| 2,322,753 | 6/1943 | Thomas | 248/229 X |
| 2,540,584 | 2/1951 | Jaycox | 248/229 X |
| 2,913,740 | 11/1959 | Eldridge | 248/68 R X |
| 2,920,853 | 1/1960 | Bufogle | 248/287 X |
| 3,008,679 | 11/1961 | Powell | 248/226.1 |
| 3,193,229 | 7/1965 | Stock | 248/226.5 |
| 3,251,069 | 5/1966 | Clark | 248/75 X |
| 3,338,538 | 8/1967 | Roche | 248/75 |
| 3,627,244 | 12/1971 | Nicholas | 248/103 |
| 4,023,757 | 5/1977 | Allard et al. | 248/70 |

FOREIGN PATENT DOCUMENTS

| | | | |
|---|---|---|---|
| 2234237 | 1/1974 | Fed. Rep. of Germany | 248/287 |
| 531992 | 8/1955 | Italy | 248/287 |

Primary Examiner—Rodney H. Bonck
Attorney, Agent, or Firm—Salter & Michaelson

[57] ABSTRACT

A device for adjustably positioning tubes for oral engagement by immobile bed patients such as quadraplegics having a base member of generally U-shaped configuration having an open end for receipt of a support member such as a mattress and to which an upright bracket is slidably attached to the upper portion thereof. An extension is in turn mounted to the upright bracket and is provided at its upper end with tube holding means. Both the extension and the bracket are longitudinally slidable and pivotally mounted with respect to each other and the base member so as to enable positioning of the tube holding means in a wide variety of positions with respect to the patient.

1 Claim, 5 Drawing Figures

U.S. Patent  Feb. 27, 1979  4,141,524
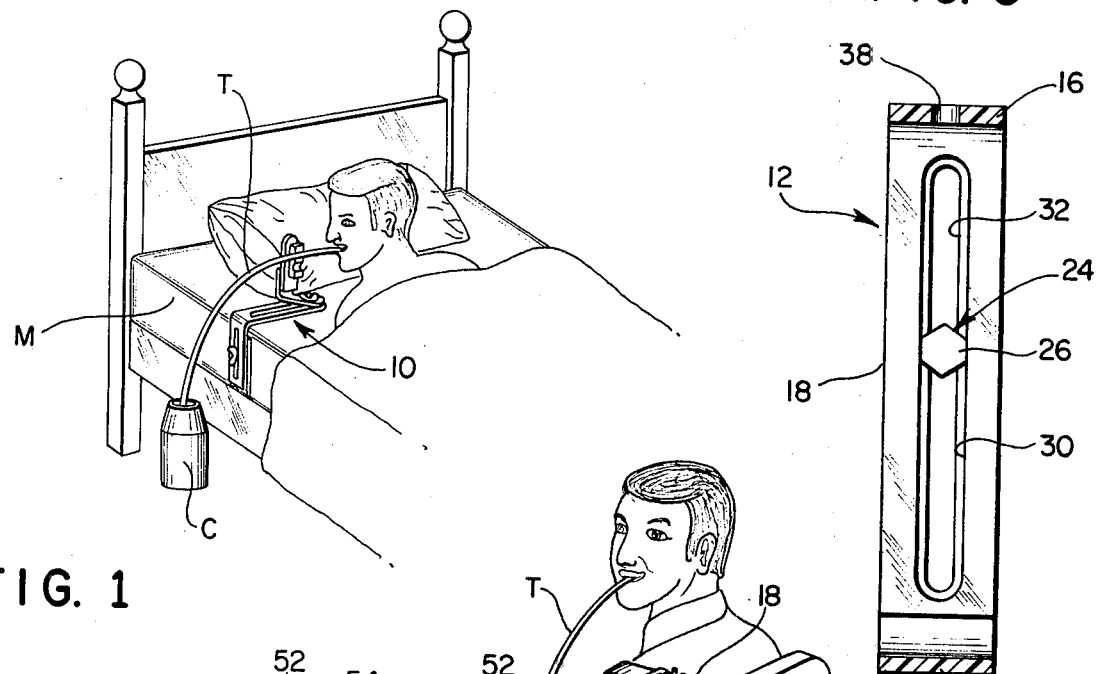
FIG. 1
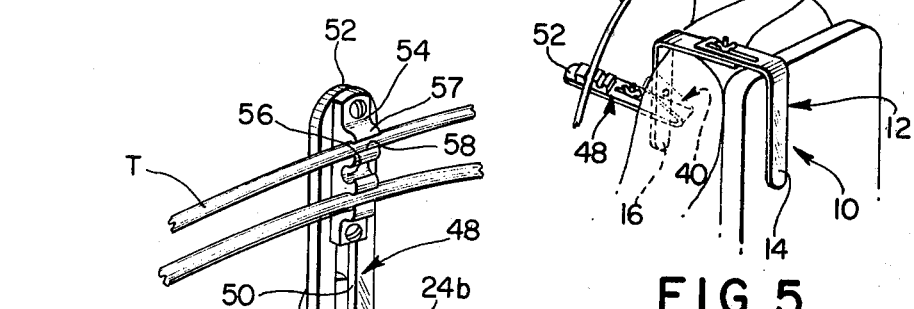
FIG. 3
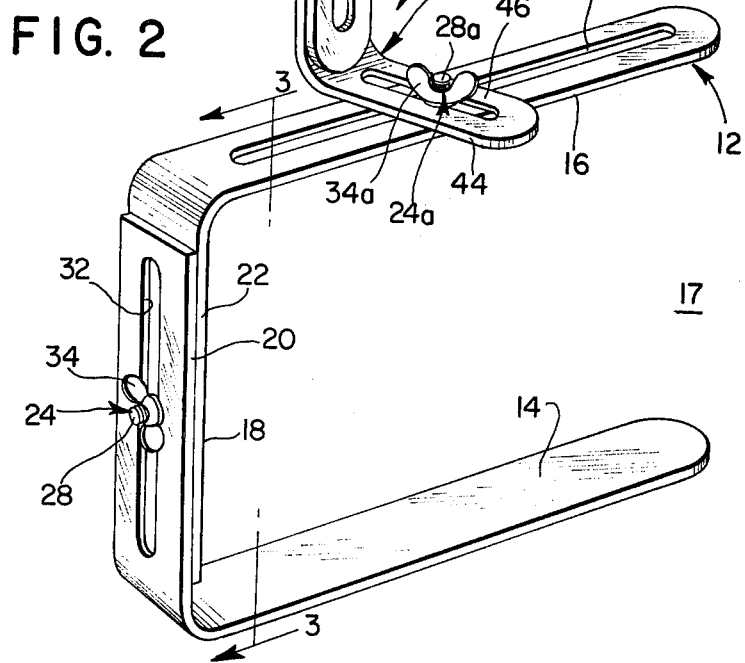
FIG. 2
FIG. 5
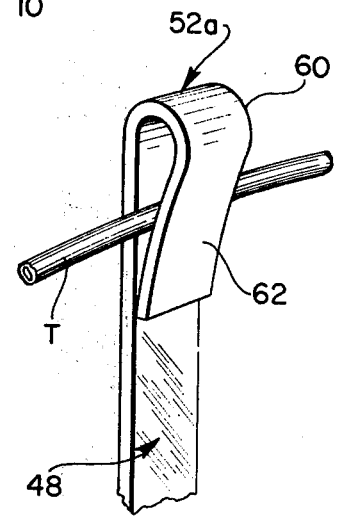
FIG. 4

TUBE HOLDER FOR IMMOBILE PATIENTS

BACKGROUND AND SUMMARY OF THE INVENTION

This invention relates to a device for positioning a tube with respect to immobile bed patients so that the patient may utilize the tube for the drinking of water, smoking, and the like. It is difficult for bedridden or otherwise immobile patients such as quadraplegics to drink, smoke or carry on other oral activities due to their inability to grasp and position objects with their hands. Generally such patients are also catheterized and accordingly must frequently drink water or other fluids in order to continually flush their kidneys. Since such patients are also completely immobile with the exception of being able to move their heads, it is necessary for nurses or other personnel to constantly attend the patient to assure that the proper amount of fluids are being taken and to physically assist the patient by holding straws, tubes or other means through which the fluid is transmitted. It is obvious that this attention is not only time consuming and expensive, but furthermore may disturb the patient as well. Accordingly, a device which could at least partially accommodate a patient's oral activities such as drinking, smoking and the like without the need of assistance would be particularly useful.

The present invention is directed to such a device and operates by positioning a drinking tube or the like in proximity to the patient wherein he or she may reach an end of the tube by neck movement alone. The device enables the tube to be moved to an almost unlimited number of positions so that once mounted in a generally effective position with regard to the patient, it can be adjusted to accommodate minor movements of the patient. The other end of the tube may be placed in a source of drinking water or other fluid so that when the patient desires to drink, the first end of the tube is grasped in the mouth and the liquid drawn up and consumed. This reduces the frequency at which attendants must check the patient and imparts a degree of independence to the patient by enabling him to drink whenever he or she desires, without the necessity of outside assistance.

It is accordingly an object of the present invention to provide a device for holding drinking tubes and the like whereby such may be supported in close proximity to the face of immobile patients and which device is adjustable in a wide variety of positions in order to accommodate patient movement.

A further object of the present invention is the provision of a holder for tubes and the like of the aforementioned type and which is of simple construction, simple to install by nursing personnel, and which is relatively inexpensive.

Another object of the present invention is the provision of a tube holder and the like which is capable of positioning a plurality of tubes with respect to a patient.

Yet another object of the invention is the provision of a tube holder and the like which is versatile in operation so as to be usable not only in conjunction with beds, but also wheelchairs and other patient supporting equipment.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention:

FIG. 1 is a perspective view showing the device of the present invention and the general manner in which such is utilized;

FIG. 2 is an enlarged perspective view of the device of the present invention and shows particularly the relationship of the various component parts thereof;

FIG. 3 is a sectional view taken along the line 3—3 of FIG. 2 and shows in particular the adjustment mechanism whereby the width of the supporting base member may be increased or decreased;

FIG. 4 is a partial perspective view showing an alternate embodiment of the tube holding means; and FIG. 5 depicts an alternate operational mode of the present device as used in conjunction with a wheelchair patient as opposed to the bed patient shown in FIG. 1.

DESCRIPTION OF THE INVENTION

Referring to the drawing and particularly FIG. 2, the overall construction of the tube positioning device 10 of the present invention is best shown. The device includes a base supporting member, a bracket and an extension which components cooperate to form the frame like structure thereof. The base supporting member 12 is of generally U-shaped configuration and includes a pair of parallel legs 14,16 defining an open end 17 and a connecting web 18 opposite thereto. Each of the legs 14,16 is in turn generally of L-shaped configuration having upwardly and downwardly directed extensions 20 and 22, respectively. These extensions 20,22 are adapted for face-to-face disposition and interconnection by means of a bolt 24 having a head 26 and a threaded shaft 28 which is adapted to pass entirely through both a slot 30 formed within the extension 22 and a slot 32 of slightly more narrow configuration longitudinally disposed in extension 20. The bolt head 26, i.e. of hexagonal configuration, is thus adapted to frictionally engage the sides of the slot 30 and is accordingly prevented from turning while that portion of the shaft 28 extending outwardly of the web 18 is adapted for engagement with a wing nut 34. It will thus be seen that by tightening the wing nut 34 the extensions 20,22 are releaseably but securely positioned with respect to each other so as to form the connecting web 18 of any desired length. By loosening the wing nut 34, the spacing between the legs 14,16 may be adjusted so as to increase or decrease the width of the open end 17 and thus enable receipt of various thickness objects, such as the mattress M depicted in FIG. 1 in order to stabilize or roughly position the device, as will hereinafter be more apparent.

The upper or free leg 16 is further provided with a longitudinally extending slot 38 so as to accommodate the generally upright positioning of an L-shaped bracket 40 with respect thereto in a manner similar to the positioning of the extensions 20,22 with respect to each other. Thus, as is best shown in FIG. 2, the bracket 40 includes an upright portion 42 and a base portion 44 which base portion is in turn provided with a longitudinally orientated slot 46. The slots 38,46 are, as indicated, positioned in at least partial alignment with each other so as to receive a bolt 24a therethrough and accordingly accommodate both longitudinal slidable positioning of the bracket 40 with respect to the upper free arm 16 and rotatable, i.e. pivotal, movement with respect thereto.

The upright portion 42 is also provided with an elongated slot (not visible) which is similar in construction to the previously described cooperating slots 30,32 and 38,46 to permit a bolt 24b to engage an upper extension 48 of generally longitudinal configuration and in turn provided with an elongated slot 50. The slot in the upright portion 42 and the slot 50 are, as previously discussed, adapted for at least partial alignment with each other for receipt of the bolt 24b; it being clear that relative loosening and tightening of the wing nut 34b enables the extension 48 to be longitudinally slidably positioned with respect to the upright 42. Thus, a slight tightening of the bolt/wing nut assembly fixes members 48,42 in longitudinal position while permitting the extension 48 to be rotatably or pivotally moved about the axis formed by the bolt shaft 28 while further tightening fixes the members 48,42 in their rotational position as well.

The frame components, that is the base supporting member 12, the bracket 40 and the extensions 48 are formed of any suitably hard, relatively strong, low surface friction materials including, but not limited to, acrylic resins etc. which permit the frame components to freely slide and rotate with respect to each other, when their respective connecting bolts have been sufficiently loosened.

The other end of the extension 48 is provided with tube holding means 52 in the form of an elongated clamp 54 having a plurality of laterally extending grooves or channels 56 each having lips 57 defining an entrance portion 58 of a width slightly less than that of the groove 56 and preferably less than the diameter of one or more tubes T adapted to be positioned therein. Each tube may be pressed or slid into one of the channels 56 and retained therein by reason of the reduced width of the entrance portion 58. The clamp 54 is generally formed of a somewhat flexible resinous material such as polyethylene, polypropylene or copolymers thereof and accordingly it provides for the temporary separation of the lips 57 forming the entrance opening 58, and in this manner accommodates direct receipt and removal of a running length of tube T into the grooves 56, rather than by threading a terminal portion of the tube T from the sides of the channels 56. Thus mounted, the tubes T may be moved back and forth laterally of the extension within the grooves to place the tube end in close proximity to the patient's mouth. Also, the grooves 56 may be of different sizes so that the clamp 54 may accommodate different size tubes.

Referring now to FIG. 1 of the drawing, the manner in which the present device is utilized is illustrated wherein the base support member 12 is positioned over an anchoring means such as the mattress M of the patient's bed so that the terminal end of the leg 16 is positioned adjacent the head of the patient. Once in this position, the bracket 40 and the extension 48 may be appropriately manipulated and positioned as by longitudinal and/or rotational movement with respect to each other so as to place the tube holder 52 in such a position that the tube or tubes are reachable solely by neck or head movement of the patient. The other end of the tube will normally be placed in a container C of drinking water or the like and in this manner enables the patient solely by neck movement to unassistedly drink from the container. Also instead of drinking, the tube can be used for other activities, either alternatively or sequentially, i.e. smoking, wherein a burning cigarette is fitted to the other end of the tube and positioned within an ashtray or the like.

The holding device 10 of the present invention also may be used with other than bed patients, such as the wheelchair patient shown in FIG. 5 of the drawing. In such case, the lower leg 14 of the base supporting member 12 is placed over the back of the wheelchair and the other leg 16 in engagement with shoulder portions of the patient. The web 18 is accordingly adjusted so that the device will snugly fit the patient's shoulder and thereafter the bracket 40 and extension 48 by sliding and/or relative rotation are adjusted so as to position the tube holder 52 closely adjacent the patient's head, and specifically, the patient's mouth.

An alternate form of tube holder 52a is also utilizable with the present device and includes a closed loop 60 formed from the terminal end of the extension 48. The end 62 of the loop either engages the extension 48 or terminates in closely spaced relation thereto so as to provide a clamp of gradually decreasing depth whereby different diameter tubes may be accommodated. More specifically, the portion of the tube T extending through loop 60 may be wedged downwardly until it is securely and frictionally gripped between the end 62 and the extension 48, it being obvious that the same gripping action can be effected, no matter what the diameter of the tube.

It is accordingly believed apparent that a convenient and highly flexible support member for providing drinking water and the like to immobile bed patients has been disclosed and that such device accomplishes the objects of the present invention.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A device for promoting unassisted immobile patient drinking and the like, said device comprising frame components including a base supporting member, a bracket and an extension and at least one tube, said base supporting member of generally U-shaped configuration having two substantially equal length generally parallel opposed legs and a connecting web defining an open end adapted for receipt of anchoring means such as a mattress or the like, with one of said legs disposed beneath said anchoring means and the other leg being disposed above said anchoring means and forming an upper free end leg, said upper free end leg thereof having said bracket pivotally mounted thereto, said bracket being of L-shaped configuration with the upright portion of said bracket disposed generally normal to said upper leg of said supporting member, said bracket having an upper generally elongated extension mounted at one end thereof to the upright portion of said bracket for pivotal movement with respect thereto, said bracket adjustably and longitudinally slidable with respect to said base member free end, and said extension adjustably longitudinally slidable with respect to the upright portion of said bracket, including means for slidably adjusting said bracket with respect to said base member and said extension with respect to said upright portion, said last means including a pair of open longitudinally extending slots disposed in at least partial alignment with each other for receipt of bolt means passing therethrough and adapted to clamp said bracket and extension respectively to said base member and said upright portion, the other end of said extension having holding means for supporting a running length of at least one tube, said tube generally transversely disposed to said holding means and having one end for contact by said patient and the other end for receipt in a supply of drinking fluid and the like, said extensions being a flat relatively narrow material strip, said other extension end terminating in a downwardly extending loop having a rear strip portion and a front strip portion integrally connected to each other by a top 180° reverse bend connecting portion, and forming said holding means, said front strip portion gradually downwardly rearwardly extending so that the terminal edge of said front portion contacts the front of said rear strip portion along a line downwardly displaced from said bent connecting portion so as to form a closed upper end wedge shaped opening between said rear and front portions, the flat opposed surfaces of said front and rear portions comprising said holding means, said tube positioned through said loop with opposite sides thereof contacting and wedgingly received by said opposed surfaces of said front and rear strip portions, said base member comprising a pair of L-shaped sections slidably interconnected to form said connecting web and means for fixedly positioning said sections including an open longitudinally extending slot disposed through each said section, said slots at least partially aligned for receipt of a bolt passing through said sections and having a bolt head non-rotatably positioned in one of said slots and a shaft for receipt of nut means on the other side thereof.

* * * * *